(12) United States Patent
Shu et al.

(10) Patent No.: US 8,182,219 B2
(45) Date of Patent: May 22, 2012

(54) FAN AND BEARING STRUCTURE (75) Inventors: Ah-Yee Shu, Taoyuan Hsien (TW);
Hao-Ming Chen, Taoyuan Hsien (TW);
Chui-Hsien Chiu, Taoyuan Hsien (TW);
Chi-Hao Hsieh, Taoyuan Hsien (TW);
Ching-Chuang Mai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 922 days.

(21) Appl. No.: 12/210,144

(22) Filed: Sep. 12, 2008

(65) Prior Publication Data

US 2009/0180727 A1    Jul. 16, 2009

(30) Foreign Application Priority Data

Jan. 15, 2008   (TW) ............................... 97101494 A
Jan. 15, 2008   (TW) ............................... 97101495 A (51) Int. Cl.
*F04D 29/04*   (2006.01)

(52) U.S. Cl. ........................................ 415/229; 416/174
(58) Field of Classification Search ................. 415/229; 416/174
See application file for complete search history.

(56) References Cited

U.S. PATENT DOCUMENTS

| 6,893,230 | B2* | 5/2005 | Sung et al. | 417/354 |
| 7,922,447 | B2* | 4/2011 | Kao | 415/229 |
| 8,016,554 | B2* | 9/2011 | Ward | 415/175 |
| 2008/0253888 | A1* | 10/2008 | Hsiao et al. | 415/229 |

* cited by examiner

*Primary Examiner* — Stephen W Smoot
(74) *Attorney, Agent, or Firm* — Muncy, Geissler, Olds & Lowe, PLLC (57) ABSTRACT The present invention provides a fan including a stator and a rotor coupled to the stator. The stator has a base and a bearing disposed inside the base. The rotor has a shaft supported by the bearing. Furthermore, the shaft has a concave structure formed on a surface thereof, or the bearing has a groove structure formed on a surface thereof.

10 Claims, 8 Drawing Sheets

FAN AND BEARING STRUCTURE

CROSS REFERENCE TO RELATED APPLICATIONS

This Non-provisional application claims priority under 35 U.S.C. §119(a) on Patent Application No(s). 097101494, filed in Taiwan, Republic of China on Jan. 15, 2008, and Patent Application No(s). 097101495, filed in Taiwan, Republic of China on Jan. 15, 2008, the entire contents of which are hereby incorporated by reference.

BACKGROUND OF THE INVENTION

1. Field of the Invention

The present invention relates to a fan, and relates to a bearing structure of the fan.

2. Description of the Prior Art

Figure 1:
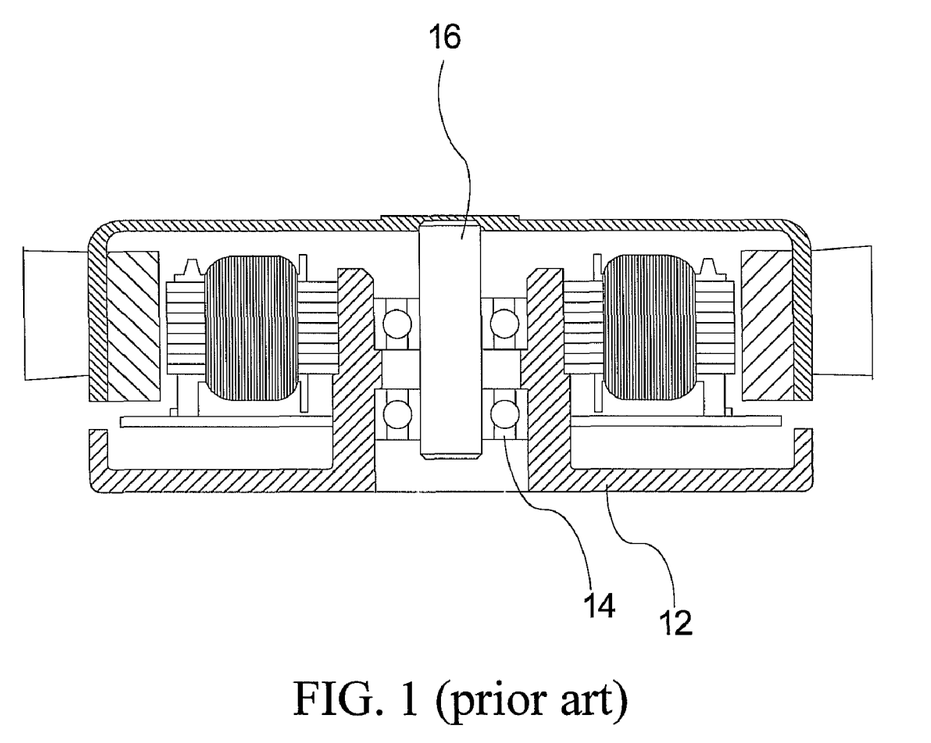
FIG. 1 is a cross-sectional view of a conventional fan.

Fans are usually used in dissipating heats generated by interior electric components during operation all the time. A conventional fan shown in FIG. 1 includes a stator and a rotor. The stator includes a base 12 and a ball bearing 14 disposed inside the base 12. The base 12 and the ball bearing 14 support the shaft 16 of the rotor together. The ball bearing 14 includes an inner ring and an outer ring rotating relative to each other. The outer ring urges against the base 12, and the inner ring urges against the shaft 16. Therefore, the cooperation elements must allow certain of deformation to achieve a tight press. However, the deformation causes the variation of the size of the element, and causes a non-uniform stress induced by the element. During the fan operation process, the inner ring of the ball bearing 14 rotates corresponding to the shaft 16 so as to generate heat because of the friction, and the heat will enlarge the variation. Additionally, when the shaft is in operation, the size of the shaft varies because of heats, and the abrasion becomes serious, such that the lifetime of the shaft and the ball bearing is lowered. Therefore, after the fan operates in a period of time, the stability of the fan will be lowered by the variation.

SUMMARY OF THE INVENTION

The present invention is to provide a fan and a bearing structure therein.

According to the design of the present invention, a fan includes a stator and a rotor. The stator includes a base and a bearing disposed inside the base. The rotor is coupled to the stator, and includes a shaft supported by the bearing. Therein, a concave structure is formed on a surface of the shaft. The concave structure includes a section plane, an annular concave, a spiral concave, a transversal concave, a longitudinal concave, an oblique concave, a polygonal concave, or a combination thereof.

Additionally, the fan further includes an impeller coupled to an end of the shaft. Therein, multiple airflow-guiding plates are formed on an inner surface of a hub of an impeller. When the impeller rotates, the airflow-guiding plates can guide airflows to pass through the concave structure.

Preferably, the bearing has a top end-surface, a bottom end-surface, and at least one groove structure. The groove structure extends out of the top end-surface or the bottom end-surface to allow airflows to pass through the groove structure.

According to another design of the present invention, the fan includes a stator and a rotor coupled to the stator. The stator includes a base and a bearing disposed inside the base, and a groove structure is formed on a surface of the bearing. The rotor includes a shaft supported by the bearing.

A groove structure is formed on a surface of the bearing. The groove structure can be a spiral groove, an annular groove, a transversal groove, a longitudinal groove, an oblique groove, a polygonal groove, or a combination thereof. The groove structure of the bearing is formed on a surface of an inner ring or a surface of an outer ring. Or, the groove structure is formed on both surfaces of an inner ring and an outer ring of the bearing.

Therefore, compared with the prior art under a condition of the same engagement, there is a smaller contacting area between the shaft and the bearing of the present invention and/or between the bearing and the base of the present invention. Such that, the size variation of the fan caused by the engagement is reduced, the whole structure becomes more stable, and the shaft can rotate smoothly. Further, airflows can be allowed to pass through the groove structure of the bearing to dissipate the heat generated by the fan during operation. According, the size variation of the fan is reduced, and the stability of rotation is kept. Additionally, the airflow-guiding plates disposed around the engagement between the shaft and the impeller can enhance the convection of airflows through the groove structure. Thus, the size variation caused by heat is highly reduced, and the stability of rotation is raised.

The advantage and spirit of the present invention can be understood by the following recitations together with the appended drawings.

DETAILED DESCRIPTION OF THE INVENTION

Figure 2A:
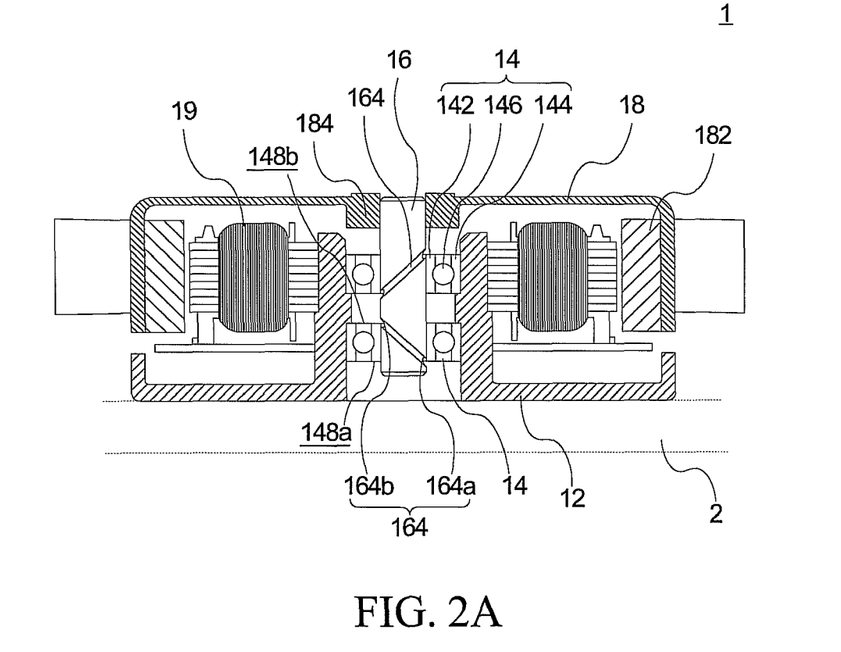
FIG. 2A is a cross-sectional view of a fan according to a first embodiment of the present invention.

Please refer to FIG. 2A, FIG. 2A is a cross-sectional view of the fan 1 according to the first embodiment of the present invention. The fan 1 includes a base 12, a bearing 14, a shaft 16, an impeller 18, and an electromagnetic element 19. The fan 1 connects to a fixed part 2 (shown as dotted lines) of a system via the base 12.

The base 12 is used for accommodating the bearing 14. The bearing 14 is a ball bearing and includes an inner ring 142, an outer ring 144, and multiple balls 146 disposed between the inner ring 142 and the outer ring 144. The outer ring 144 of the bearing 14 urges against the base 12. A concave structure is formed on the shaft 16, and the concave structure is an annular structure 164 in this embodiment. The shaft 16 passes through the inner ring 142 of the bearing 14 and urges against the inner ring 142. The bearing 14 thereon defines two opposite surfaces 148a and 148b, and the annular concave 164 includes two parts 164a and 164b respectively protruding out of the aforesaid surfaces 148a and 148b. Accordingly, airflows can be allowed to pass through the annular concave 164, such that the heat generated by the fan 1 during operation can be dissipated. It should be additionally remarked that the impeller 18 is coupled to an end of the shaft 16, the fan 1 further includes a magnetic ring 182 cooperated with the electromagnetic element 19 to actuate the fan 1 to rotate. When the fan 1 rotates, the shaft 16 rotates with the inner ring 142 of the bearing 14 at the same time.

Figure 2B:
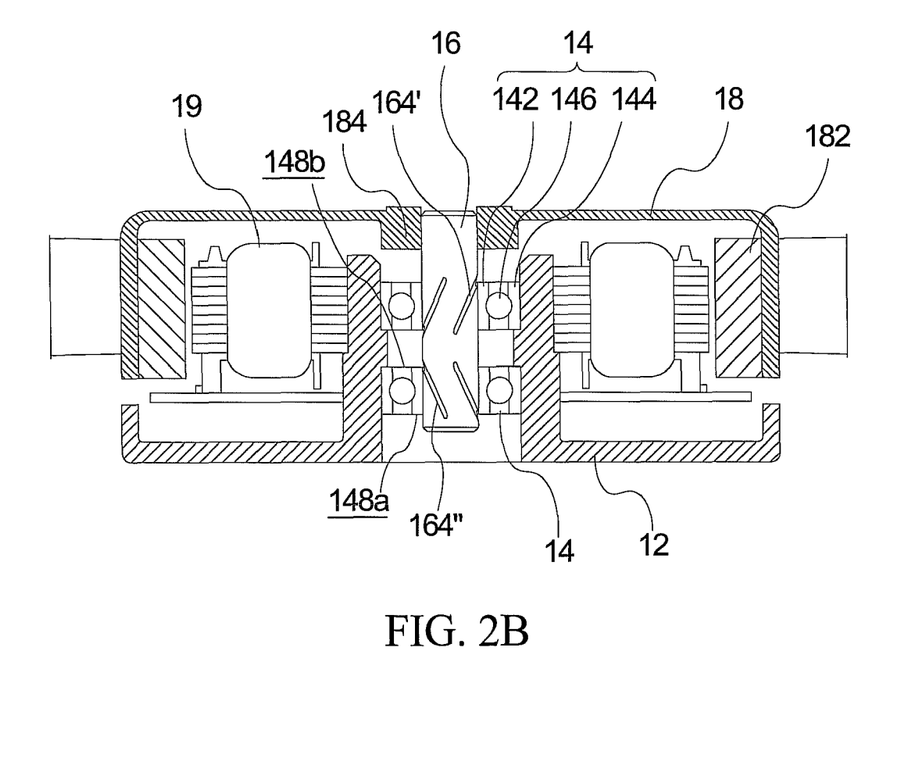
FIG. 2B is a cross-sectional view of a fan according to a second embodiment of the present invention.
Figure 2C:
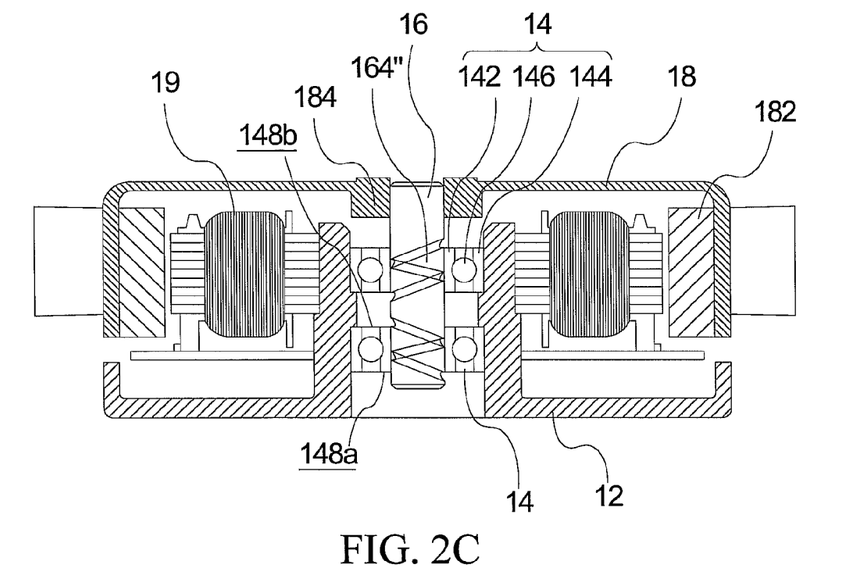
FIG. 2C is a cross-sectional view of a fan according to a third embodiment of the present invention.

In the second embodiment of the present invention, the concave structure can be an oblique concave 164' as shown in FIG. 2B. In the third embodiment, the concave structure includes one or multiple spiral concave 164" as shown in FIG. 2C.

Figure 2D:
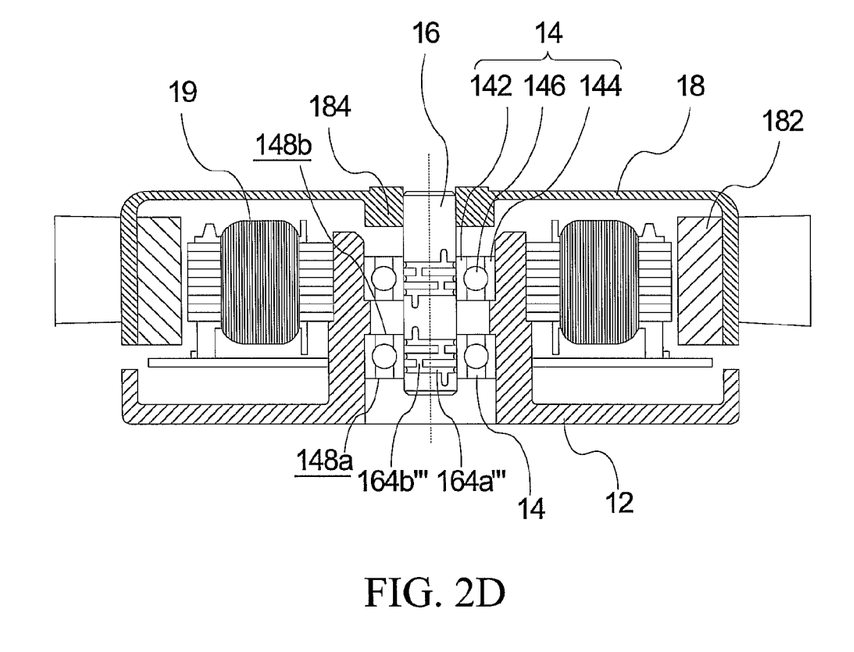
FIG. 2D is a cross-sectional view of a fan according to a fourth embodiment of the present invention.

In the fourth embodiment, the concave structure includes multiple transversal concaves 164a''' and multiple longitudinal concaves 164b''' connected to the transversal concaves 164a''', as shown in FIG. 2D. The aforesaid transverse and longitude are relative to the central axis of the shaft (shown as the dotted line in FIG. 2D). Although the transversal concaves 164a''' are not directly connected to exterior air, the whole concave structure via the engagements of the longitudinal concaves 164b''' can allow airflows to pass through the transversal concaves 164a''' and the longitudinal concaves 164b'''. Additionally, the aforesaid annular concave 164, the oblique concave 164', and the spiral concave 164" can be combined alternatively and formed on the surface of the shaft 16.

Figure 3A:
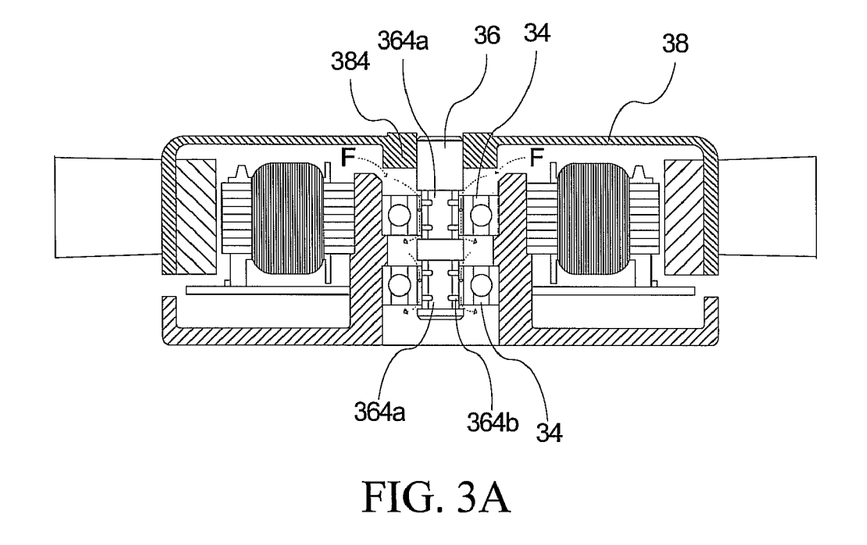
FIG. 3A is a cross-sectional view of a fan according to a fifth embodiment of the present invention.
Figure 3B:
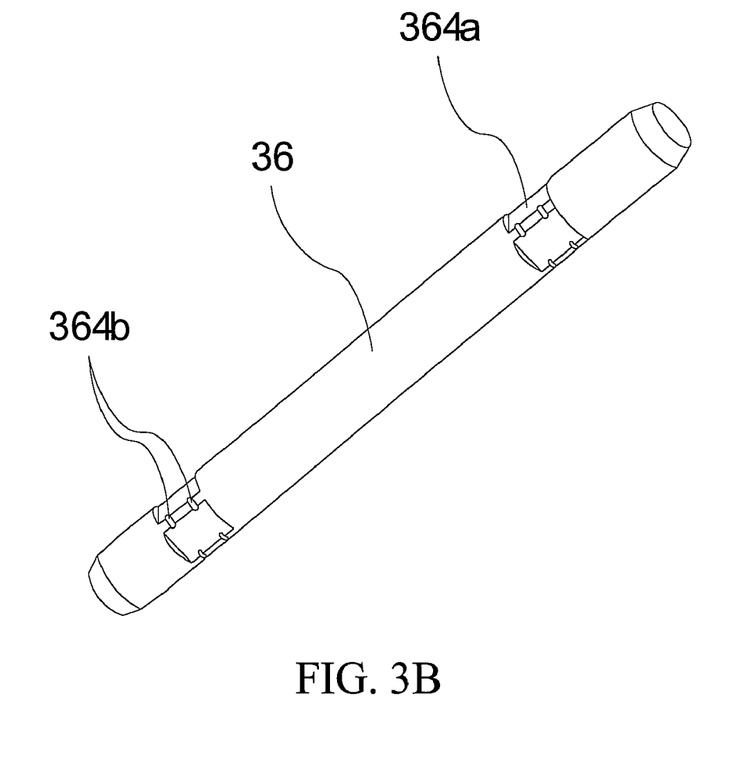
FIG. 3B is a schematic illustration showing the shaft of the fan shown in FIG. 3A.
Figure 3C:
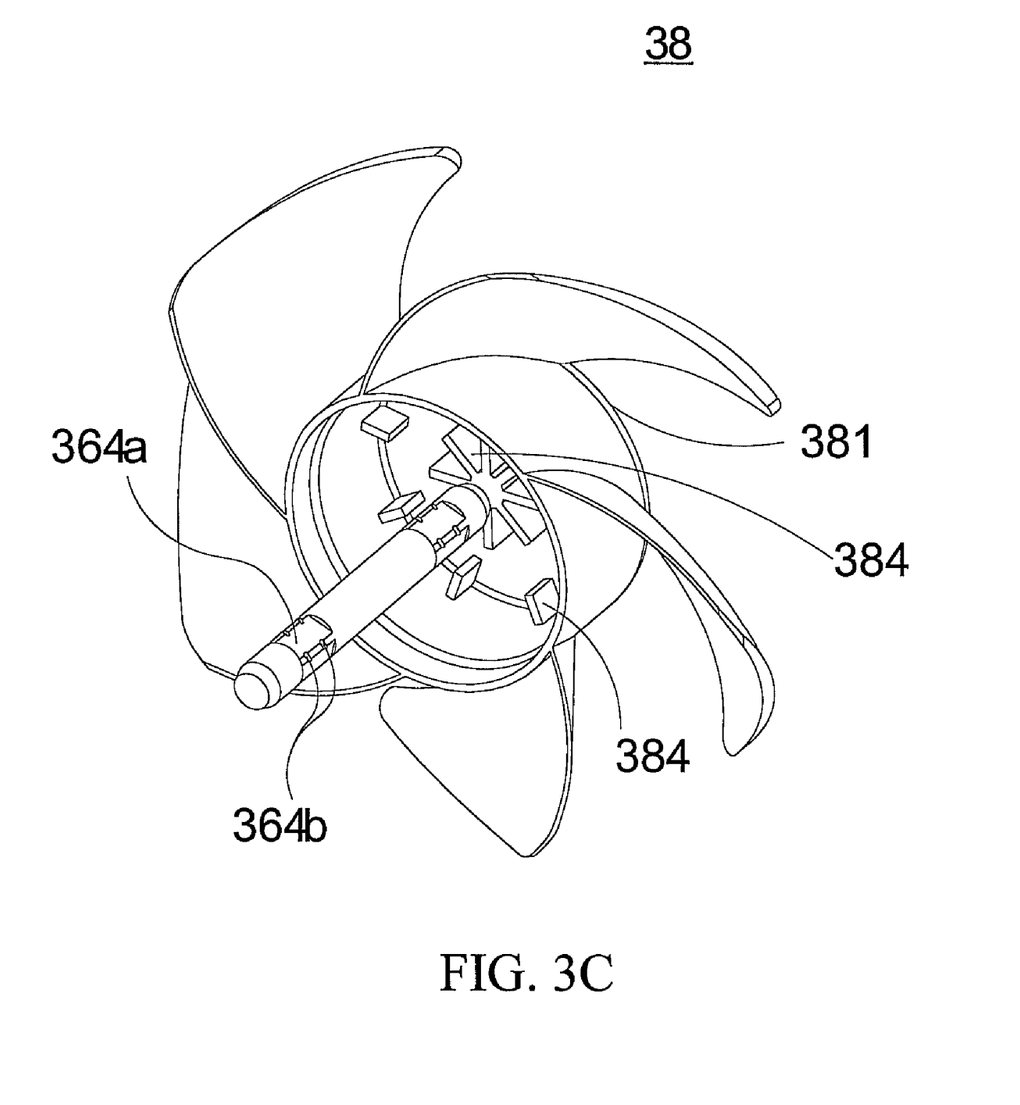
FIG. 3C is a schematic illustration showing the impeller of the fan shown in FIG. 3A.

Please refer to FIG. 3A, FIG. 3A is a cross-sectional view of the fan 3 according to a fifth embodiment of the present invention. Compared with the aforesaid first embodiment, the concave structure includes multiple section-planes 364a and multiple concaves 364b, and an enlarged schematic illustration of the shaft 36 of the fan 3 is shown in FIG. 3B. When the impeller 38 rotates, the airflow-guiding plates 384 on the impeller 38 will guide airflows to pass between the section-plane 364a and the bearing 34. The schematic path of airflow F is shown as a dotted line with an arrow in the FIG. 3A. The design of the airflow-guiding plates 384 is shown in FIG. 3C, the airflow-guiding plates 384 is formed on an inner surface of the cup-shaped hub 381 of the impeller 38, and help guiding airflow F to pass through the concave structure. Therefore, the heat generated by the fan 3 during operation can be quickly dissipated by the airflow F.

According to the aforesaid embodiments, when the shaft has a concave structure, not only the contacting area between the shaft and the bearing can be reduced, but also the size variation can be reduced. Furthermore, the dissipation is enhanced by the concave structure with a penetration structure, the size variation caused by heat is reduced, and the durability and stability can be raised.

Figure 4A:
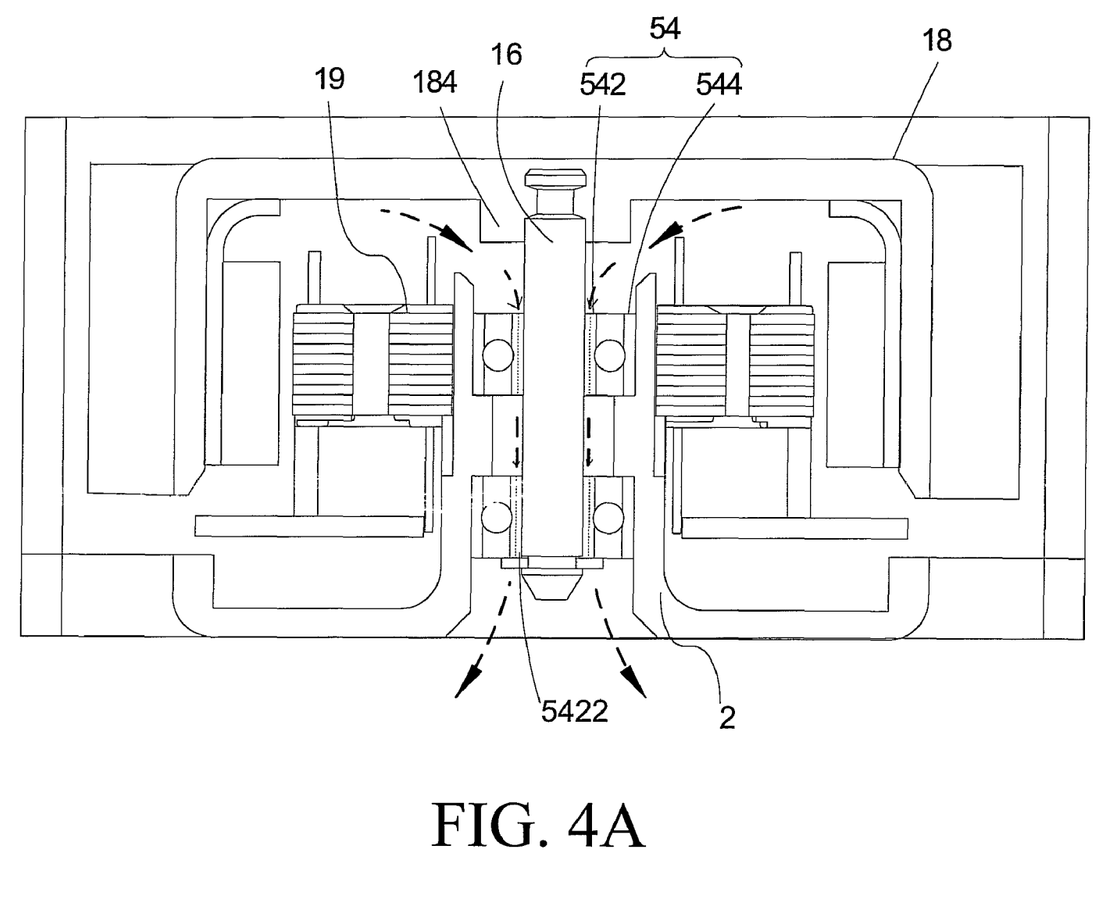
FIG. 4A is a cross-sectional view of a fan according to a sixth embodiment of the present invention.
Figure 4B:
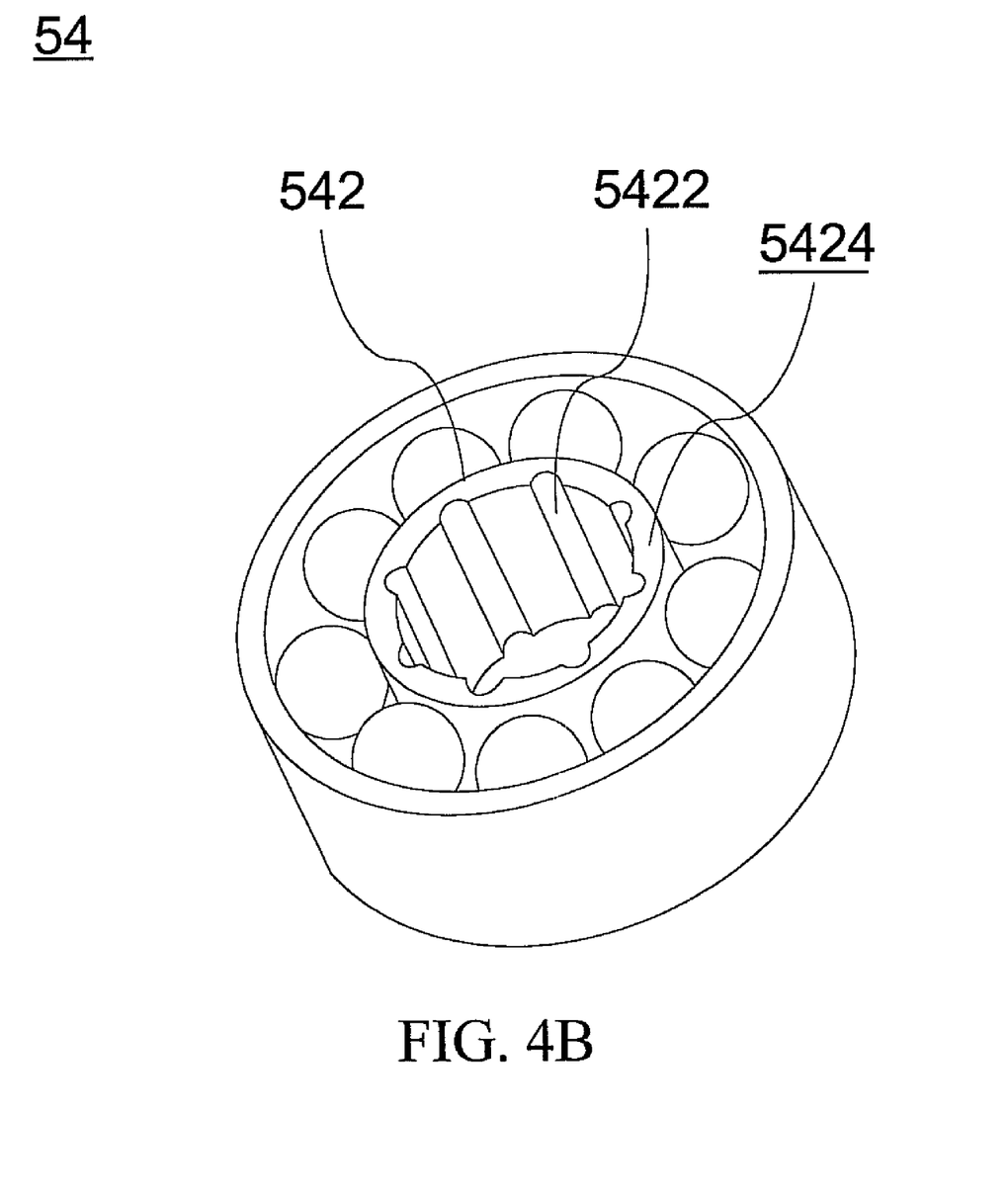
FIG. 4B~4D are schematic illustrations showing different kinds of bearing of the fan shown in FIG. 4A.

The concave structure of the fan of the present invention is formed on the shaft, and the groove structure can also be formed on the bearing to achieve a purpose of the reduction of the size variation. Further, the dissipation of heat can be enhanced as well. FIG. 4A is a fan according to the sixth embodiment of the present invention. The sixth embodiment is similar in structure to the first embodiment, and the difference is that the groove structure in the sixth embodiment is formed on the ball bearing 54. As shown in FIG. 4B, multiple longitudinal grooves 5422 (parallel to the extension direction of the shaft) are formed on the inner ring 542 of the ball bearing 54, therefore the contacting area between the ball bearing 54 and the shaft is reduced. Additionally, the longitudinal grooves 5422 penetrate through two opposite surfaces 5424 (a top end-surface and a bottom end-surface) of the ball bearing 54. Thereby, when the shaft is engaged to the ball bearing 54, the longitudinal groove 5422 can be formed as a tunnel, and airflows can pass through the tunnel to dissipate the heat generated by the ball bearing 54 during operation. The path of airflows is shown as a dotted line with an arrow in FIG. 4A.

Figure 4C:
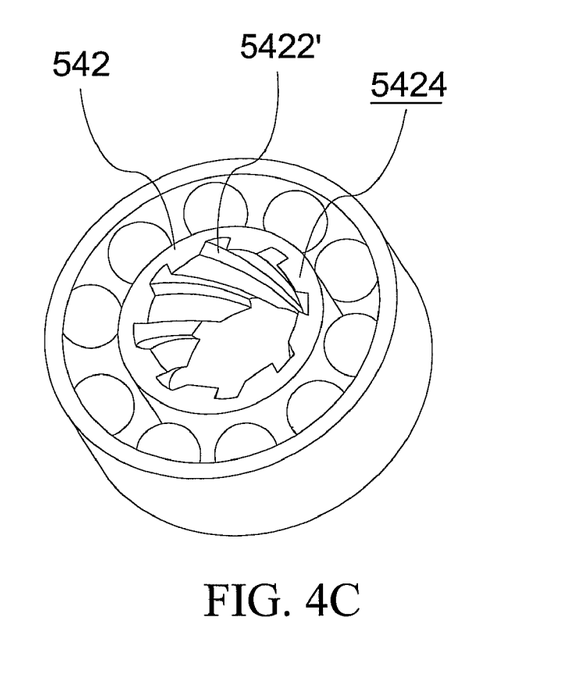

Of course, the aforesaid longitudinal groove 5422 can be replaced with the spiral groove or the oblique groove 5422' shown in FIG. 4C. The groove structure can also be a combination of the aforesaid grooves 5422 and 5422'.

Figure 4D:
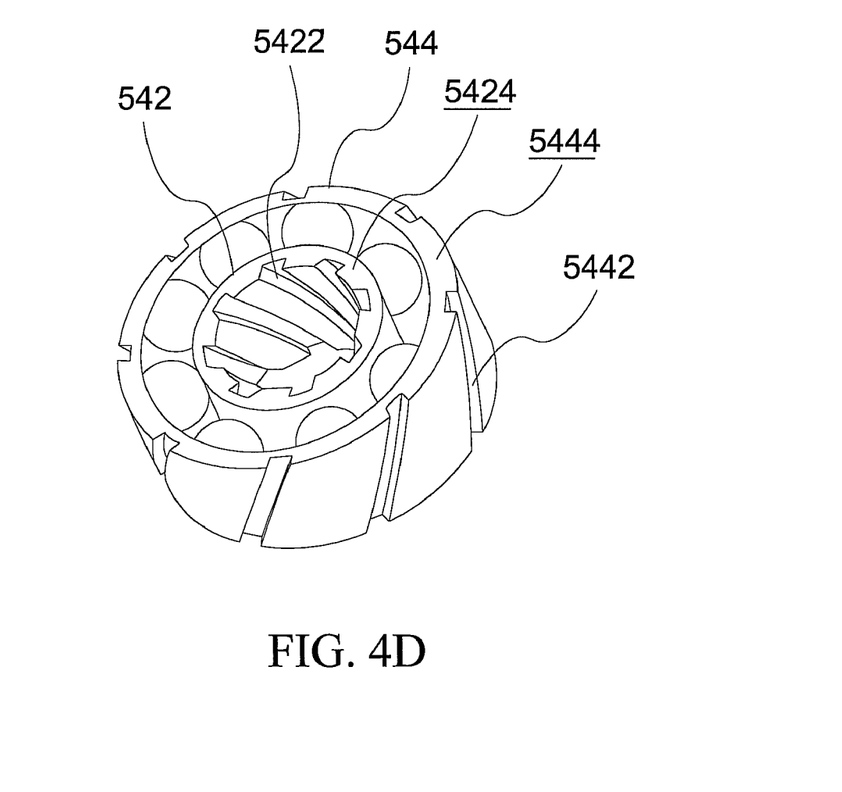

Additionally, as shown in FIG. 4D, multiple grooves 5422' and 5442 can also be formed on the inner ring 542 and the outer ring 544 of the ball bearing. Although the grooves 5422' and 5442 are spiral grooves, the present invention is not limited to this. For example, the groove structure can have two oblique grooves and the two oblique grooves are disconnected and formed as V-shaped. In another example, the groove structure can have four oblique grooves are disconnected and formed as V-shaped, or the groove structure can have at least two spiral grooves. In another example, the groove structure can have a plurality of transversal grooves and longitudinal grooves connected to the transversal grooves.

Because the ball bearing urges against the base of the present invention, there is also a problem of a size variation in the cooperation between the ball bearing and the base. Therefore, the formation of the multiple grooves on the outer ring of the ball bearing of the present invention can reduce the contacting area between the ball bearing and the base, and further to reduce the size variation caused by engagement. Furthermore, the engagement between the ball bearing and the base has less effect on the ball bearing and on the engagement between the bearing and shaft. Similarly, when the grooves 5442 on the outer ring 544 penetrate through two opposite surfaces 5444 of the ball bearing 54', the groove 5442 also has the same heat-dissipation effect as the groove 5422' on the inner ring 542, and it is not described here again.

Although the groove structures penetrating two opposite surfaces of the bearing are mostly described in the aforesaid embodiments, but the present invention is not limited to this. The groove structure of the fan of the present invention can also be a polygonal groove, and the structure can reduce the contacting area between the shaft and the bearing or between the bearing and the base as well. Further, the size variation caused by the engagement can be reduced as well.

As a whole, the shaft and the bearing of the present invention having concave structures and groove structures respectively, such that the contacting area between the shaft and the bearing or between the bearing and the base is reduced. Further, the size variation caused by the engagement is highly reduced, the whole structure is more stable, and the shaft can rotate smoothly. Additionally, airflows can be allowed to pass through the groove structure penetrating two opposite surfaces of the bearing to dissipate heat generated by the fan during operation, such that the size variation is reduced and the stability of the rotation is kept. Finally, the airflow-guiding plates disposed around the engagement between the impeller and the shaft can enhance the convection of airflows through the concave structure, and the size variation caused by heat can be highly reduced to raise the stability of the rotation.

With the example and explanations above, the features and spirits of the present invention will be hopefully well described. Those skilled in the art will readily observe that numerous modifications and alterations of the device may be made while retaining the teaching of the present invention. Accordingly, the above disclosure should be construed as limited only by the metes and bounds of the appended claims.

What is claimed is:

1. A fan, comprising:
   a stator comprising a base, and a bearing disposed inside the base;
   a rotor coupled to the stator and the rotor comprising a shaft supported by the bearing, and the shaft comprising a concave structure; and
   an impeller coupled to an end of the shaft, wherein the impeller comprises a plurality of airflow-guiding plates on an interior surface of a hub of the impeller, and when the impeller rotates, the airflow-guiding plates can guide airflows to pass through the concave structure.

2. The fan of claim 1, wherein the concave structure comprises a section plane, an annular concave, a spiral concave, a transversal concave, a longitudinal concave, an oblique concave, a polygonal concave, and a combination thereof.

3. The fan of claim 1, wherein the bearing comprises a top end-surface, a bottom end-surface, and at least one groove structure, and the groove structure extends out of the top end-surface or the bottom end-surface and airflows are allowed to pass through the groove structure.

4. The fan of claim 1, wherein the bearing comprises at least one groove structure, and the groove structure of the bearing comprises an annular groove, a spiral groove, a transversal groove, a longitudinal groove, a oblique groove, a polygonal groove, or a combination thereof.

5. The fan of claim 1, wherein the bearing comprises at least one groove structure formed on a surface of an inner ring of the bearing, and/or the groove structure of the bearing is formed on a surface of an outer ring of the bearing.

6. A fan, comprising:
   a stator comprising a base and a ball bearing disposed inside the base, wherein the ball bearing comprises a groove structure on a surface of the ball bearing;
   a rotor coupled to the stator and including a shaft supported by the ball bearing; and
   an impeller coupled to an end of the shaft, wherein the impeller comprises a plurality of airflow-guiding plates on an interior surface of a hub of the impeller, and when the impeller rotates, the airflow-guiding plates can guide airflows to pass through the groove structure.

7. The fan of claim 6, wherein the groove structure comprises an annular groove, a spiral groove, a transversal groove, a longitudinal groove, an oblique groove, a polygonal groove, or a combination thereof.

8. The fan of claim 6, wherein the groove structure is formed on a surface of an inner ring of the ball bearing, and/or the groove structure is formed on a surface of an outer ring of the ball bearing.

9. The fan of claim 6, wherein the shaft comprises a concave structure.

10. The fan of claim 9, wherein the concave structure of the shaft comprises a section plane, an annular concave, a spiral concave, a transversal concave, a longitudinal concave, an oblique concave, a polygonal concave, and a combination thereof.

* * * * *